(12) United States Patent
Zhou et al.

(10) Patent No.: US 12,396,010 B2
(45) Date of Patent: Aug. 19, 2025

(54) METHOD AND USER EQUIPMENT FOR DETERMINING RESOURCE FOR SIDELINK COMMUNICATION

(71) Applicant: Samsung Electronics Co., Ltd., Suwon-si (KR)

(72) Inventors: Miao Zhou, Beijing (CN); Yi Wang, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 415 days.

(21) Appl. No.: 17/577,918

(22) Filed: Jan. 18, 2022

(65) Prior Publication Data
US 2022/0240260 A1    Jul. 28, 2022

(30) Foreign Application Priority Data

Jan. 25, 2021 (CN) .................. 202110096668.0
Jun. 11, 2021 (CN) .................. 202110655366.2

(51) Int. Cl.
*H04W 72/25* (2023.01)
*H04W 72/20* (2023.01)
*H04W 72/542* (2023.01)

(52) U.S. Cl.
CPC ........... *H04W 72/25* (2023.01); *H04W 72/20* (2023.01); *H04W 72/542* (2023.01)

(58) Field of Classification Search
CPC .................................................. H04W 72/25
See application file for complete search history.

(56) References Cited

U.S. PATENT DOCUMENTS

| | | | |
|---|---|---|---|
| 2021/0045093 A1* | 2/2021 | Rao | H04W 72/04 |
| 2021/0298080 A1* | 9/2021 | Wu | H04L 27/26025 |
| 2021/0329662 A1* | 10/2021 | Stefanatos | H04L 5/0044 |
| 2023/0328777 A1* | 10/2023 | Stefanatos | H04W 74/0816 |
| | | | 370/329 |
| 2023/0345529 A1* | 10/2023 | Van Phan | H04W 74/002 |

FOREIGN PATENT DOCUMENTS

| | | |
|---|---|---|
| WO | 2020/027533 A1 | 2/2020 |
| WO | 2020/028662 A1 | 2/2020 |
| WO | 2020/033628 A1 | 2/2020 |

OTHER PUBLICATIONS

Fraunhofer HHI et al., 'Resource Allocation Enhancements for Mode 2', R1-2100702, 3GPP TSG RAN WG1 Meeting #104-e, Jan. 18, 2021, sections 2-3.5; and figures 1-2.

Mediatek Inc., 'Discussion on Mode 2 enhancements', R1-2008975, 3GPP TSG RAN WG1 Meeting #103-e, Nov. 1, 2020, sections 2-2.3; and figures 1-2.

(Continued)

*Primary Examiner* — Jason E Mattis
(74) *Attorney, Agent, or Firm* — Jefferson IP Law, LLP

(57) ABSTRACT

A method and a user equipment (UE) for determining a resource for sidelink communication are provided. The method includes determining, by a user equipment (UE), a resource set for sidelink communication; and determining, by the UE, the resource for sidelink communication according to the resource set, wherein the resource for sidelink communication is determined according to at least one of the resource set or a configuration from a node.

10 Claims, 11 Drawing Sheets

(56) References Cited

OTHER PUBLICATIONS

Fujitsu, 'Considerations on Inter-UE Coordination for Mode 2 Enhancements', R1-2100746, 3GPP TSG RAN WG1 Meeting #104-e, Jan. 18, 2021, sections 2.2-2.7.
International Search Report and Written Opinion dated May 2, 2022, issued in International Patent Application No. PCT/KR2022/001285.
Extended European Search Report dated Mar. 5, 2024, issued in European Patent Application No. 22742914.9.
European Office Action dated Jun. 13, 2025, issued in European Patent Application No. 22742914.9.

* cited by examiner

METHOD AND USER EQUIPMENT FOR DETERMINING RESOURCE FOR SIDELINK COMMUNICATION

CROSS-REFERENCE TO RELATED APPLICATION(S)

This application is based on and claims priority under 35 U.S.C. § 119(a) of a Chinese patent application number 202110096668.0, filed on Jan. 25, 2021, in the China National Intellectual Property Administration, and of a Chinese patent application number 202110655366.2, filed on Jun. 11, 2021, in the China National Intellectual Property Administration, the disclosure of each of which is incorporated by reference herein in its entirety.

BACKGROUND

1. Field

The disclosure relates to the technical field of wireless communication. More particularly, the disclosure relates to a method and an apparatus for Sidelink (SL) communication in a wireless system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid frequency shift keying (FSK) and quadrature amplitude modulation (QAM) (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for SL communication in a wireless system.

Additional aspects will be set forth in part in the description which follows and, in part, will be apparent from the description, or may be learned by practice of the presented embodiments.

In accordance with an aspect of the disclosure, a method for determining a resource for sidelink communication is provided. The method includes determining, by a user equipment (UE), a resource set for sidelink communication, and determining, by the UE, the resource for sidelink communication in the resource set.

In some implementations, the determining of the resource for sidelink communication in the resource set by the UE includes determining, by the UE, the resource for sidelink communication according to the resource set, and/or determining, by the UE, the resource for sidelink communication in the resource set according to a configuration from a node.

In some implementations, UE determines, according to a pre-configuration or a configuration of a higher layer or node, that the UE determines the resource for sidelink communication according to the resource set and/or that the UE determines the resource for sidelink communication according to the configuration from the node.

In some implementations, the determining of the resource for sidelink communication in the resource set by the UE according to the configuration from the node includes transmitting, by the UE, the resource set to the node, and determining the resource for sidelink communication in the resource set according to the configuration from the node.

In some implementations, the determining of the resource for sidelink communication in the resource set by the UE according to the configuration from the node includes measuring, by the UE, link quality of each resource in the resource set transmitting, by the UE, the link quality to the node, or transmitting the resource set and corresponding link quality to the node, and determining the resource for sidelink communication in the resource set according to the configuration from the node.

In some implementations, the determining of the resource for sidelink communication by the UE according to the resource set includes determining, by the UE, the resource for sidelink communication according to link quality of each resource and/or a priority of each resource in the resource set.

In some implementations, the determining of the resource for sidelink communication by the UE according to the resource set includes transmitting, by a physical layer of the UE, the resource set and/or corresponding link quality to a higher layer of the UE itself, and determining, by the higher layer, the resource for sidelink communication, or determining, by the physical layer of the UE, the resource for sidelink communication according to the link quality of each resource and/or the priority of each resource.

In some implementations, the determining of the resource set for sidelink communication by the UE includes determining, by the UE, the resource set according to the configuration from the node and/or the higher layer configuration and/or pre-configuration.

In some implementations, the resource set for sidelink communication includes a time domain resource set and/or a frequency domain resource set, and the link quality of each resource in the resource set includes link quality of each time domain resource in the time domain resource set and/or link quality of each frequency domain resource in the frequency domain resource set.

In some implementations, the frequency domain resource set includes at least one of a set of carriers configured by the node, and a preconfigured set of carriers.

In some implementations, the time domain resource set includes at least one of periodic time domain resources, and a resource within a specific time range before or after a specific time reference point, wherein the specific time reference point includes at least one of a time point when the UE is required to determine the resource for sidelink communication, a time point when the UE determines the resource for sidelink communication, a time point when the UE is expected to access or accesses a sidelink carrier.

In some implementations, the link quality of each resource in the resource set includes when measuring on a licensed band, including at least one of Sidelink Received Signal Strength Indication (SL-RSSI), Sidelink Reference Signal Receiving Power (SL-RSRP), Sidelink Reference Signal Receiving Quality (SL-RSRQ), Sidelink Signal State Information (SL-CSI), Channel Occupation Ratio (CR), Channel Busy Ratio (CBR), and measurement parameters based on other reference signals, and when measuring on an unlicensed band, including SL-RSSI.

In some implementations, the transmitting of the resource set and the corresponding link quality to the node by the UE includes transmitting all of resources in the resource set and corresponding link quality to the node, or transmitting a subset of all of the resources in the resource set and corresponding link quality to the node.

In some implementations, the transmitting of the resource set to the node by the UE includes transmitting all of resources in the resource set to the node, or transmitting a subset of all of the resources in the resource set to the node.

In some implementations, the transmitting of the link quality to the node by the UE includes transmitting corresponding link quality of all of resources in the resource set to the node, or transmitting corresponding link quality of a subset of all of the resources in the resource set to the node.

In some implementations, the priority of each resource is determined by the UE according to at least one of a frequency domain position of each resource, a preconfigured priority of each resource, or a preconfigured criteria for determining the priority of each resource, and link quality corresponding to each resource.

In some implementations, the transmitting of the link quality to the node or the transmitting of the resource set and the corresponding link quality to the node by the UE includes transmitting the link quality to the node or transmitting the resource set and the corresponding link quality to the node by the UE when a specific condition is satisfied, wherein the specific condition includes the UE being triggered by the node to transmit and/or the UE being triggered by itself to transmit.

In some implementations, the method further includes transmitting, by the UE, the resource set to the node when a specific condition is satisfied, wherein the specific condition includes the UE being triggered by the node to transmit and/or the UE being triggered by itself to transmit.

In some implementations, when transmitting the link quality to the node, or transmitting the resource set and the corresponding link quality to the node by the UE, at least one of the following is further transmitted a used sidelink resource that is expected to be replaced, and a used sidelink resource that is expected to be remained.

In some implementations, when transmitting the resource set to the node by the UE, at least one of the following is further transmitted a used sidelink resource that is expected to be replaced, and a used sidelink resource that is expected to be remained.

In some implementations, the transmitting of the link quality to the node or the transmitting of the resource set and the corresponding link quality to the node by the UE includes transmitting using at least one of the following signaling or channels radio resource control (RRC) signaling, media access control (MAC) signaling, and physical uplink control channel (PUCCH).

In some implementations, the transmitting of the resource set to the node by the UE includes transmitting using at least one of the following signaling or channels radio resource control (RRC) signaling, a media access control (MAC) signaling, and physical uplink control channel (PUCCH).

In some implementations, the resource for sidelink communication include a carrier on a licensed band and/or unlicensed band for sidelink communication.

In some implementations, the node includes one of a base station, and other sidelink UEs.

In some implementations, the sidelink communication includes obtaining, by the UE, channel occupancy or a channel occupancy time (COT), and transmitting and/or receiving, by the UE, a sidelink signal and/or sidelink channel within the channel occupancy or COT.

In some implementations, the method further includes determining, by the UE, one or more switching points within a COT based on COT structure related information which is indicated by a base station and/or predefined or preconfigured, wherein the one or more switching points correspond to at least one of switching between uplink and downlink, switching between uplink and sidelink, switching between downlink and sidelink, and switching between sidelink and sidelink.

In some implementations, the method further includes determining, by the UE, whether to perform listen before talk (LBT), and/or which type of LBT to perform, before transmitting and/or receiving the sidelink signal or channel.

In some implementations, the determining includes at least one of not performing the LBT and/or performing a specific type of LBT before transmitting and/or receiving the sidelink signal or channel, if the UE starts to transmit and/or receive the sidelink signal or channel at a starting position of a COT, performing the specific type of LBT before transmitting and/or receiving the sidelink signal or channel, if the UE starts to transmit and/or receive the sidelink signal or channel after a switching point, and performing, by the UE, the specific type of LBT before starting any transmission and/or reception of the sidelink signal or channel.

In some implementations, the method further includes transmitting and/or receiving, by the UE, the sidelink signal or channel within the COT using a first slot structure, where the first slot structure is adjusted based on a second slot structure, and the adjusting includes, in the second slot structure adding a gap at or before a starting position of a slot, adding a gap at or before a starting position of a Physical Sidelink Shared Channel (PSSCH), adding a gap at or after an ending position of the PSSCH, adding a gap at or before a starting position of a Physical Sidelink Feedback Channel (PSFCH), and adding a gap at or after an ending position of the PSFCH.

In some implementations, the adjusting further includes at least one of shortening a length of one or more symbols of the slot after adding the gap at or before the starting position of the slot, shortening a length of one or more symbols of the PSSCH after adding the gap at or before the starting position of the PSSCH, shortening a length of one or more symbols of the PSSCH after adding the gap at or after the ending position of the PSSCH, shortening a length of one or more symbols of the PSFCH after adding the gap at or before the starting position of the PSFCH, and shorten a length of one or more symbols of the PSFCH after adding the gap at or after the ending position of the PSFCH.

In some implementations, the obtained COT includes a COT initialized by the UE and/or a COT initialized by a base station and shared to the UE and/or a COT initialized by other UEs and shared to the UE, and the method further includes performing, by the UE, sensing within the obtained COT and/or a COT initialized by the other UEs and used for sidelink communication, not performing, by the UE, sensing on resources other than the COT obtained by the UE and/or the COT initialized by the other UEs and used for sidelink communication, or skipping, by the UE, the sensing within the COT if the UE monitors interference in a LBT process before the COT.

Another embodiment of the disclosure provides a user equipment (UE), including a transceiver for transmitting and receiving signals, a processor, and a memory in which instructions executable by the processor are stored, wherein the instructions, when executed by the processor, cause the processor to perform the aforementioned method.

In accordance with another aspect of the disclosure a method for determining a resource for sidelink communication is provided. The method includes receiving, by a node apparatus, a resource set and/or a corresponding link quality from a UE, and configuring, by the node apparatus, the resource for sidelink communication for the UE according to the resource set and/or the corresponding link quality.

In some implementations, the resource set includes a time domain resource set and/or a frequency domain resource set, and the corresponding link quality includes link quality corresponding to the time domain resource set and/or link quality corresponding to the frequency domain resource set.

In some implementations, the frequency domain resource set includes at least one of a set of carriers configured by the node apparatus, and a preconfigured set of carriers.

In some implementations, the time domain resource set includes at least one of periodic time domain resources, and a resource within a specific time range before or after a specific time reference point, wherein the specific time reference point includes at least one of a time point when the UE is required to determine the resource for sidelink communication, a time point when the UE determines the resource for sidelink communication, a time point when the UE is expected to access or accesses a sidelink carrier.

In some implementations, the corresponding link quality includes when the UE measures the corresponding link quality on a licensed band, including at least one of Sidelink Received Signal Strength Indication (SL-RSSI), Sidelink Reference Signal Receiving Power (SL-RSRP), Sidelink Reference Signal Receiving Quality (SL-RSRQ), Sidelink Signal State Information (SL-CSI), Channel Occupation Ratio (CR), Channel Busy Ratio (CBR), and measurement parameters based on other reference signals, and when the UE measures the corresponding link quality on an unlicensed band, including SL-RSSI.

In some implementations, the receiving of the resource set and/or the corresponding link quality by the node apparatus from the UE includes receiving all of resources in the resource set and corresponding link quality from the UE, or receiving a subset of all of the resources in the resource set and corresponding link quality from the UE.

In some implementations, when the node apparatus receives the resource set and/or the corresponding link quality from the UE, at least one of the following is further received a used sidelink resource that is expected to be replaced, and a used sidelink resource that is expected to be remained.

In some implementations, the receiving of the resource set and/or the corresponding link quality by the node apparatus from the UE includes receiving through at least one of the following signaling or channels radio resource control (RRC) signaling, media access control (MAC) signaling, and physical uplink control channel (PUCCH).

In some implementations, the resource for sidelink communication include a carrier on a licensed band and/or unlicensed band for sidelink communication.

In some implementations, the node apparatus includes one of a base station, and other sidelink UEs.

In accordance with another aspect of the disclosure a node apparatus is provided. The node apparatus includes a transceiver for transmitting and receiving signals, and a processor configured to receive a resource set and/or corresponding link quality from a UE, and configure a resource for sidelink communication for the UE according to the resource set and/or the corresponding link quality.

The disclosure provides a method for determining a resource for sidelink communication, which enables the sidelink communication to be applied on a wider spectrum and a larger bandwidth, effectively improving the throughput of the sidelink communication and expanding the application scenarios of the sidelink communication.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
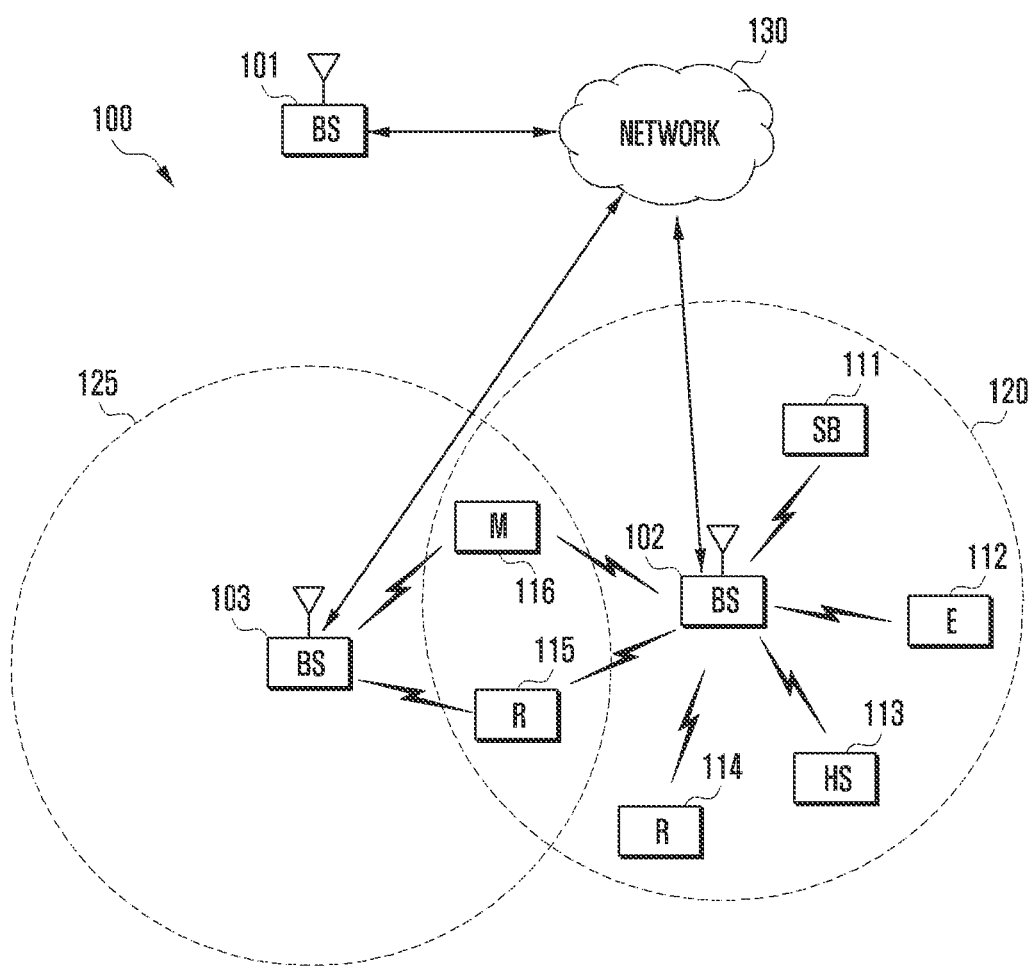
FIG. 1 illustrates a schematic diagram of an example wireless network according to an embodiment of the disclosure.

The following description with reference to the accompanying drawings is provided to assist in a comprehensive understanding of various embodiments of the disclosure as defined by the claims and their equivalents. It includes various specific details to assist understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Unless otherwise defined, the technical or scientific terms used in the disclosure shall have the ordinary meanings understood by those having ordinary skills in the field to which the disclosure belongs. The terms "first," "second," and the like used in this disclosure do not indicate any order, quantity, or importance, but are only used to distinguish different components. Similarly, "a," "an," or "the" and the like do not indicate a limit on quantity, but rather indicate that there is at least one. Words such as "including" or "comprising" mean that the element or item appearing before the word encompasses the element or item appearing after the word and the equivalent thereof without excluding other elements or items. Words such as "connected" or "interconnected" are not limited to physical or mechanical connections, but may include electrical connections, whether direct or indirect. "Upper," "lower," "left," "right," etc., are only used to indicate the relative positional relationship, and in a case where the absolute position of the object to be described is changed, the relative positional relationship may also be changed accordingly.

The advantages and features of one or more embodiments of the disclosure and implementation methods thereof can be more easily understood by referring to the following detailed description of the embodiments and the accompanying drawings. In this regard, the embodiment may have different forms and should not be construed as being limited to the descriptions set forth herein. Rather, these embodiments are provided so that this disclosure will be thorough and complete, and will fully convey the concept of the embodiments to those skilled in the art, and the scope of protection of this disclosure will be limited only by the appended claims.

Here, it will be understood that a flowchart or a combination of blocks in a process flowchart may be executed by computer program instructions. These computer program instructions can be loaded into a processor of a general purpose computer, special purpose computer, or another programmable data processing device, so the instructions executed by a computer or a processor of another programmable data processing device are created for execution unit of functions described in flowchart block(s). Computer program instructions may be stored in a computer-usable or computer-readable memory capable of directing a computer or another programmable data processing device to perform a function in a particular way, and therefore, instructions stored in the computer-usable or computer-readable memory can also produce manufacturing items that contain instruction units for performing the functions described in the flowchart block. Computer program instructions may also be loaded into a computer or another programmable data processing device, and therefore, in a case where a series of operations are performed in the computer or the other programmable data processing device, instructions of the computer or the other programmable data processing device operated by generating a process performed by the computer can provide operations for performing the functions described in the flowchart block.

In addition, each block may represent module, segment, or portion of code, where the module, segment, or code includes one or more executable instructions for performing specified logical function(s). It should also be noted that in some alternative implementations, the functions mentioned in the block may not appear in order. For example, two blocks shown in sequence may in fact be executed concurrently, or the blocks may sometimes be executed in a reverse order according to corresponding functions.

The term "unit" in an embodiment of the disclosure means a software component or a hardware component (such as a field programmable gate array (FPGA) or an application specific integrated circuit (ASIC)) that performs a specific function. However, the term "unit" is not limited to software or hardware. A "unit" may be formed to be in an addressable storage medium or may be formed to operate one or more processors. Thus, for example, the term "unit" may refer to components such as software components, object-oriented software components, class components, and task components, and may include procedures, functions, properties, programs, subroutines, program code segments, drivers, firmware, microcode, circuits, data, databases, data structures, tables, arrays, or variables. The functions provided by components and "units" can be associated with fewer components and "units," or can be divided into additional components and "units." In addition, components and "units" may be embodied as reproducing one or more Central Processing Units (CPUs) in a device or a secure multimedia card. Furthermore, in embodiments, a "unit" may include at least one processor.

In the description of the disclosure, when it is considered that some detailed explanations about functions or configurations may unnecessarily obscure the essence of the disclosure, these detailed explanations will be omitted. All terms (including descriptive or technical terms) used herein should be interpreted as having apparent meanings to those of ordinary skill in the art. However, these terms may have different meanings according to the intention of those of ordinary skill in the art, precedents or the emergence of new technologies, and therefore, the terms used herein must be defined based on the meanings of these terms together with the description throughout the specification. Hereinafter, for example, the base station may be at least one of a next generation Node B (gNode B or gNB), an evolved Node B (eNode B or eNB), a Node B, a radio access unit, a base station controller, and a node on a network. The terminal may include a user equipment (UE), a mobile station (MS), a mobile phone, a smart phone, a computer or multimedia system capable of performing communication functions. In some implementations of the disclosure, the downlink (DL) is a wireless transmission path through which signals are transmitted from a base station to a terminal, and the uplink (UL) is a wireless transmission path through which signals are transmitted from a terminal to a base station. In addition, one or more embodiments of the disclosure may be applied to fifth generation (5G) wireless communication technologies (5G, new radio (NR)) developed after long term evolution advanced (LTE-A), or to new wireless communication technologies proposed on the basis of fourth generation (4G) or 5G (for example, B5G (Beyond 5G) or 6th generation (6G)).

At present, sidelink communication in NR systems only supports direct communication between UEs. Because transmission power of a UE is limited, its coverage may be small correspondingly; combining with a regulation of keeping a large distance between vehicles at high vehicle speed, in some specific scenarios, a UE with a communication requirement in traffic may not be in a direct communication range of the other party. Therefore, it is necessary to consider a sidelink communication technology based on relay.

When relay-based sidelink communication is supported within the system, a node that needs to be relayed, also called a remote node, needs to determine how to select a suitable relay node.

In a device-to-device (D2D) technology of Release 13, the UE selects a relay node with optimal signal strength based on measurement. The measurement of the relay node is performed based on a Reference Signal Receiving Power (RSRP) measurement of its discovery signal. However, in NR systems, no discovery signal/channel is defined, so it is necessary to determine how to measure the relay node.

The text and drawings are provided as examples only to help readers understand the disclosure. They are not intended and should not be interpreted as limiting the scope of the disclosure in any way. Although certain embodiments and examples have been provided, based on the content disclosed herein, it is obvious to those skilled in the art that modifications to the illustrated embodiments and examples can be made without departing from the scope of the disclosure.

FIG. 1 illustrates an example wireless network according to an embodiment of the disclosure. The embodiment of the wireless network 100 shown in FIG. 1 is for illustration only. Other embodiments of the wireless network 100 can be used without departing from the scope of the disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) (e.g., network 130), such as the Internet, a private IP network, or other data networks.

Depending on a type of the network, other terms such as "base station" or "access point" can be used instead of "gNodeB" or "gNB." For convenience, the terms "gNodeB" and "gNB" are used in this patent document to refer to network infrastructure components that provide wireless access for remote terminals. And, depending on the type of the network, other terms such as "mobile station," "user station," "remote terminal," "wireless terminal" or "user apparatus" can be used instead of "user equipment" or "UE." For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. gNB 103 provides wireless broadband access to network 130 for a second plurality of UEs within a coverage area 125 of gNB 103. The second plurality of UEs include a UE 115 and a UE 116. In some examples, one or more of gNBs 101-103 can communicate with each other and with UEs 111-116 using 5G, Long Term Evolution (LTE), LTE-A, worldwide interoperability for microwave access (WiMAX) or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the disclosure. In some examples, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
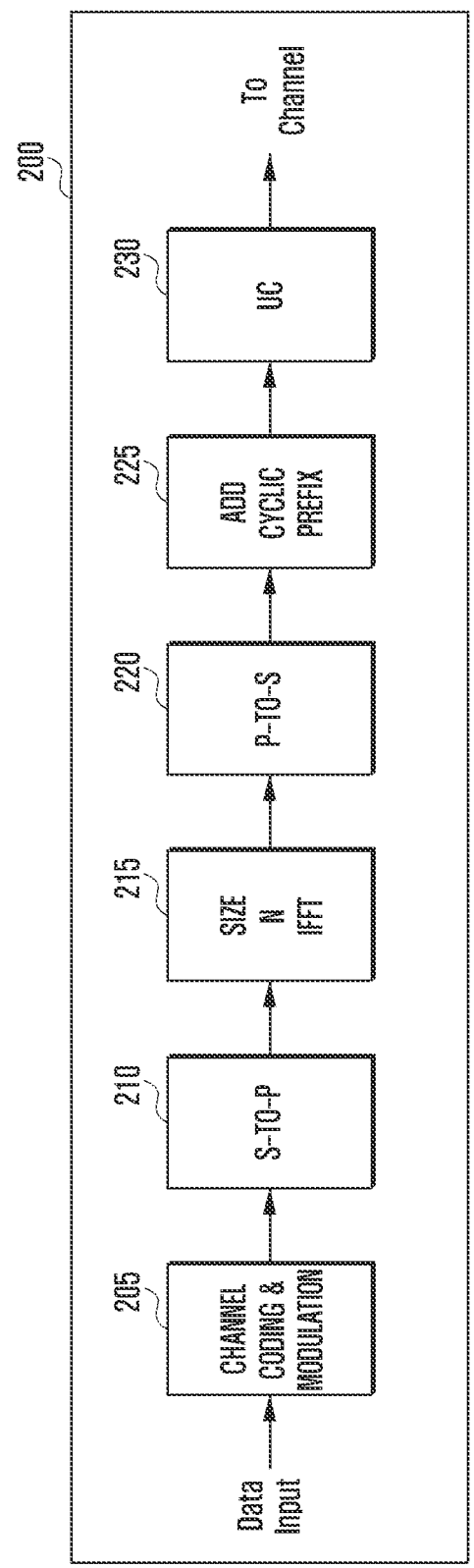
FIGS. 2A and 2B illustrate example wireless transmit and receive paths according to various embodiments of the disclosure.
Figure 2B:
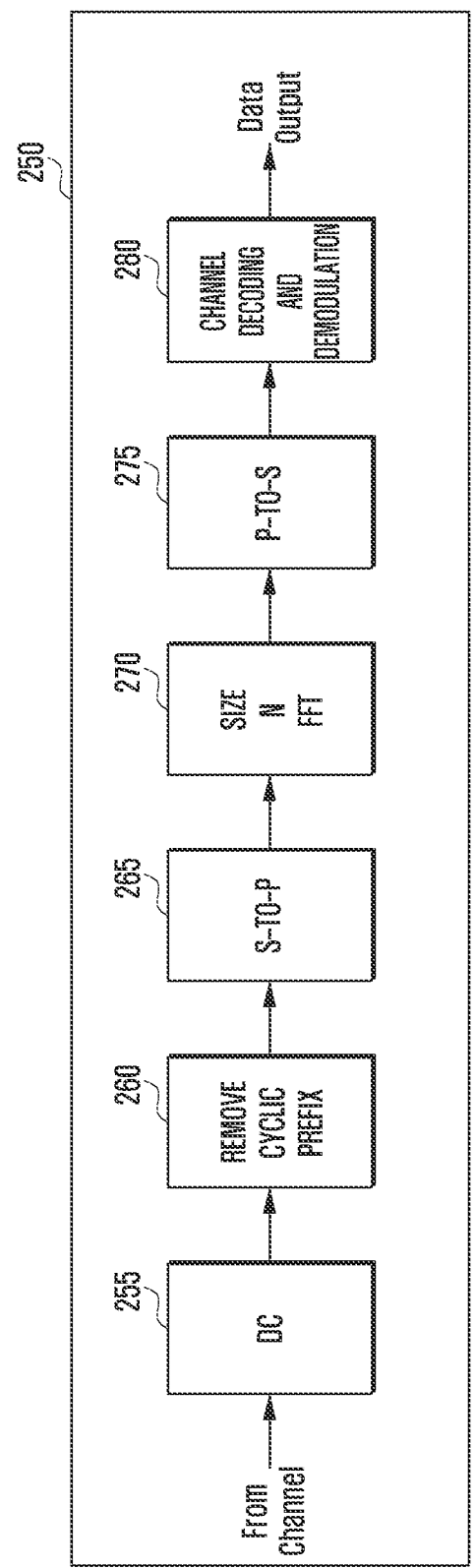

FIGS. 2A and 2B illustrate example wireless transmission and reception paths according to various embodiments of the disclosure.

In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some examples, the reception path 250 is configured to support codebook designs and structures for systems with 2D antenna arrays as described in embodiments of the disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the size N FFT block 270 and size N IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
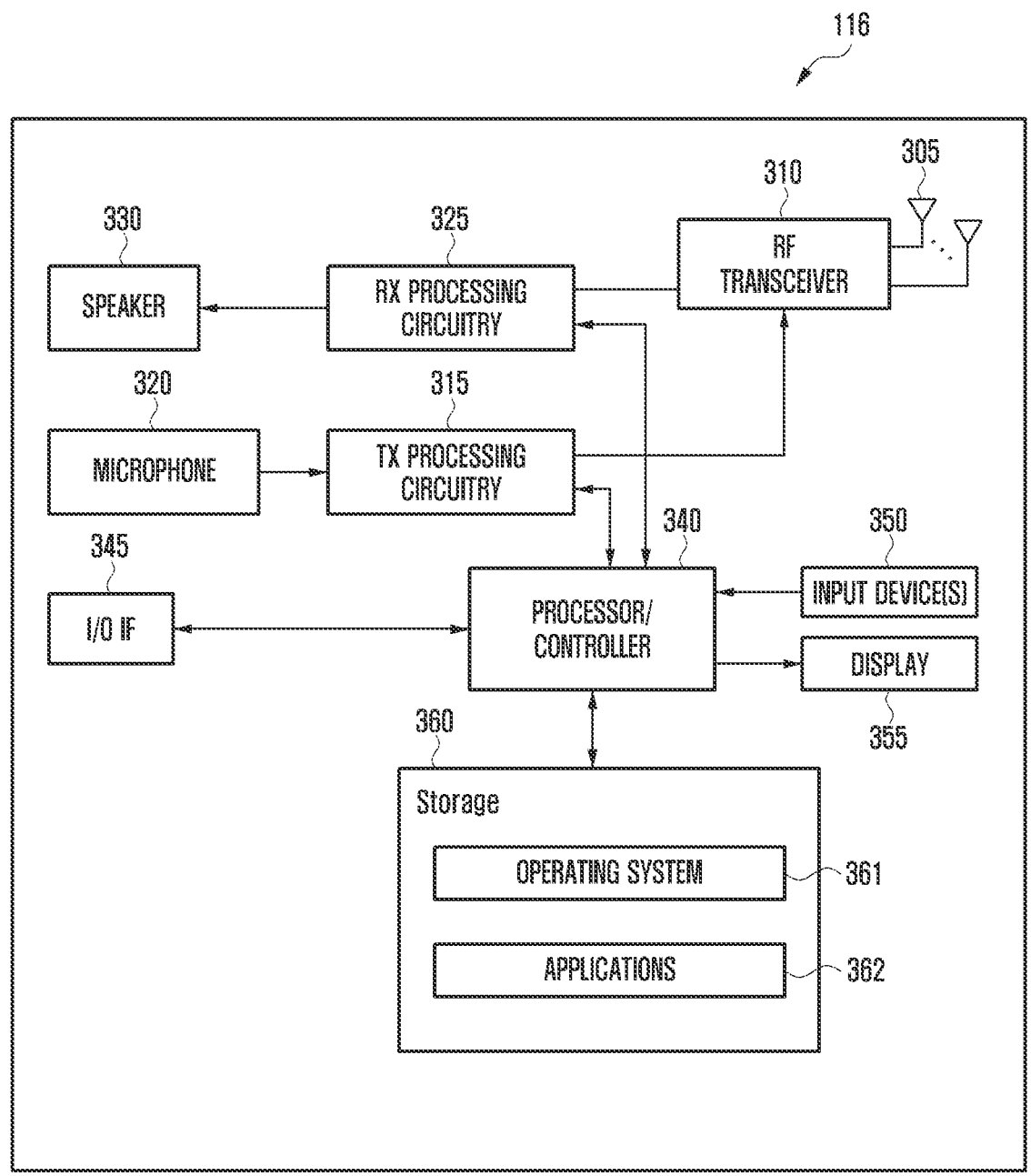
FIG. 3A illustrates an example user equipment (UE) according to an embodiment of the disclosure.

FIG. 3A illustrates an example UE according to an embodiment of the disclosure. The embodiment of UE 116 shown in FIG. 3A is for illustration only, and UEs 111-115 of FIG. 1 can have the same or similar configuration. However, a UE has various configurations, and FIG. 3A does not limit the scope of the disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315. In some examples, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some examples, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
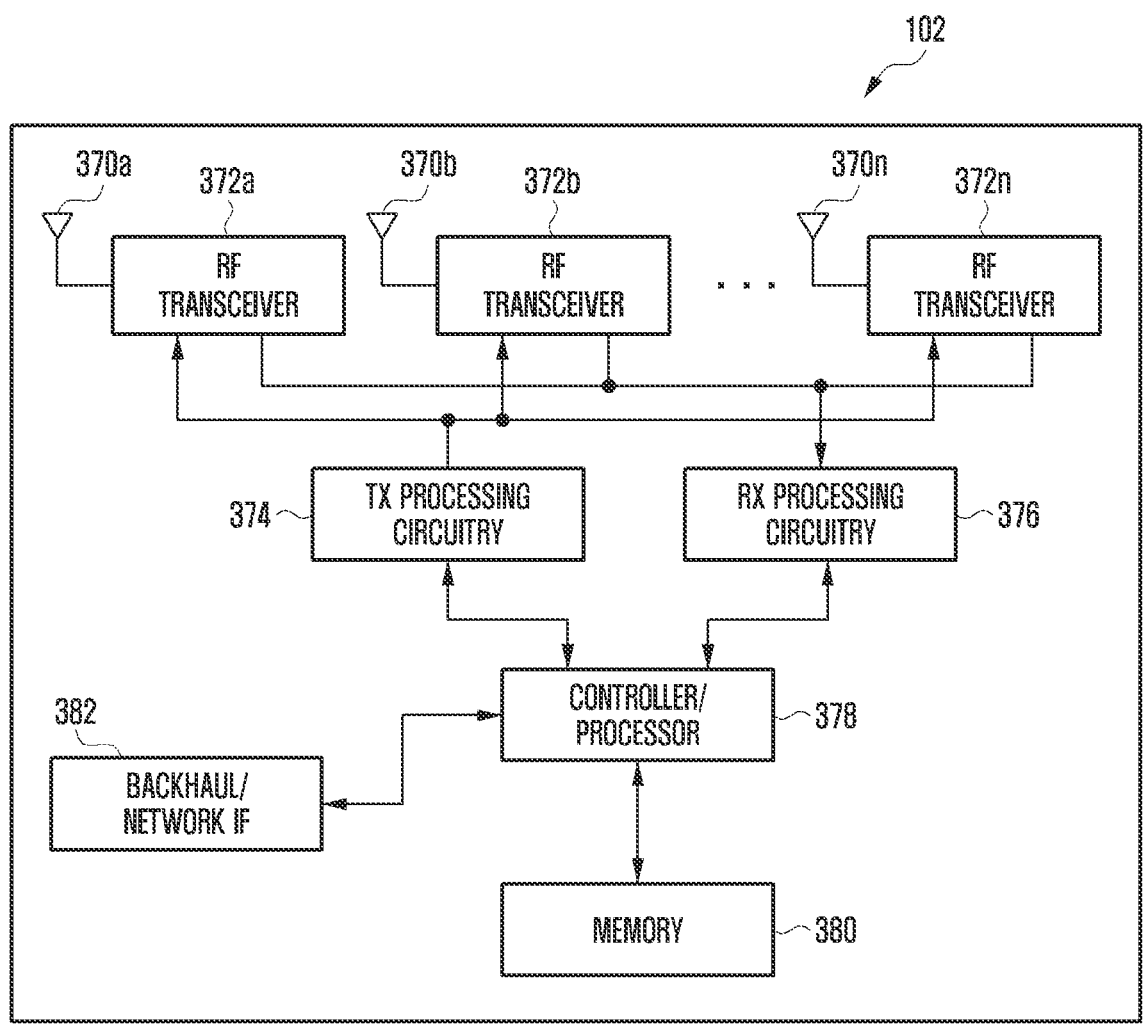
FIG. 3B illustrates an example next generation Node B (gNB) according to an embodiment of the disclosure.

FIG. 3B illustrates an example gNB according to an embodiment of the disclosure. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as gNB 102.

Referring to FIG. 3B, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some examples, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. In some examples, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

In the Long Term Evolution (LTE) technology, sidelink communication includes two main types of mechanisms including direct Device to Device (D2D) communication and Vehicle to Outside communication (Vehicle to Vehicle/Infrastructure/Pedestrian/Network, collectively referred to as V2X), where the V2X communication is designed based on the D2D technology, is superior to the D2D in data rate, delay, reliability and link capacity, and is the most representative sidelink communication technology in LTE technology. In 5G systems, sidelink communication mainly includes V2X communication currently.

As the evolution technology of LTE, 5G NR systems also include the further evolution of sidelink communication accordingly. NR V2X technology was formulated in Release 16. As the evolution version of LTE V2X technology, NR V2X has superior performance in all aspects. In Release 17, 5G NR systems are expected to further expand the application scenarios of NR V2X to other broader application scenarios, e.g., commercial sidelink communication and Public Safety (PS) scenarios.

There are several sidelink physical channels defined in NR V2X systems, including a Physical Sidelink Control Channel (PSCCH), a Physical Sidelink Shared Channel (PSSCH) and a Physical Sidelink Feedback Channel (PSFCH). The PSSCH is used to carry data, the PSCCH is used to carry Sidelink Control Information (SCI), in which information such as a time-frequency domain resource location, a modulation and coding mode of associated PSSCH transmission, an identifier ID of a receiving target at which an associated PSSCH is directed is indicated, and the PSFCH is used to carry HARQ-ACK information corresponding to the data.

Current NR V2X systems take a slot in 5G systems as a minimum unit of time-domain resource allocation, and define a sub-channel as a minimum unit of frequency-domain resource allocation, wherein one sub-channel is configured as several Resource Blocks (RBs) in frequency domain, and one sub-channel may include resources corresponding to at least one of the PSCCH, PSSCH and PSFCH.

From the perspective of resource allocation, 5G sidelink communication systems include two modes: one is a resource allocation mode based on base station scheduling; the other is a resource allocation mode in which a User Equipment (UE) selects independently. In 5G V2X systems, the resource allocation mode based on base station scheduling is referred to as Mode 1; and the resource allocation mode in which a UE selects independently is referred to as Mode 2.

For Mode 1, the resource allocation mode based on base station scheduling means that a base station transmits a sidelink grant to a UE for sidelink transmission (hereinafter referred to as "sidelink UE"), and indicates several sidelink resources for the sidelink UE to use in the sidelink grant, and/or indicates periodic sidelink resources for the sidelink UE to use in the sidelink grant. The sidelink grant includes a dynamic grant and a configured grant, wherein the dynamic grant is indicated by Downlink Control Information (DCI); the configured grant further includes a type 1 configured grant indicated by Radio Resource Control (RRC) signaling and a type 2 configured grant indicated by RRC signaling and indicated to be activated/deactivated by DCI.

For Mode 2, a method for the sidelink UE to independently select resources means that the UE determines a specific time window before performing sidelink transmission according to a time range within which the sidelink transmission is expected to be transmitted, and the UE performs channel sensing in the specific time window, then excludes sidelink resources that have been reserved by other sidelink UEs according to a result of the channel sensing, and randomly selects in sidelink resources that have not been excluded.

A slot in embodiments of the application may be either a subframe or slot in a physical sense, or a subframe or slot in a logical sense. Specifically, a subframe or slot in a logical sense is a subframe or slot corresponding to a resource pool of a sidelink communication. For example, in the V2X system, the resource pool is defined by a repeated bitmap mapped to a specific slot set, which may be all slots or all other slots except some specific slots (such as slots for transmitting the MIB/SIB). A slot indicated as "1" in the bitmap may be used for V2X transmission and belongs to slots corresponding to the V2X resource pool. A slot indicated as "0" cannot be used for V2X transmission and does not belong to slots corresponding to the V2X resource pool.

The difference between subframes or slots in a physical sense and that in a logical sense is explained by a typical application scenario: when calculating the time domain gap between two specific channels/messages (e.g., a PSSCH carrying sidelink data and a PSFCH carrying corresponding feedback information), and it is assumed that the gap is N slots, if calculating subframes or slots in a physical sense, the N slots correspond to the absolute time length of N*x milliseconds in the time domain, and x is the time length of a physical slot (subframe) under the numerology of the scenario, in milliseconds; otherwise, if calculating subframes or slots in a logical sense, taking a sidelink resource pool defined by a bitmap as an example, the intervals among the N slots correspond to N slots indicated as "1" in the bitmap, and the absolute time length of the interval varies with the specific configuration of the sidelink communication resource pool, rather than a fixed value.

In embodiments of the application, a slot may be a complete slot or several orthogonal frequency-division multiplexing (OFDM) symbols corresponding to a sidelink communication in a slot. For example, when the sidelink communication is configured to be performed on the X1-X2-th OFDM symbols in each slot, in this scenario, a slot in the following embodiments refers to the X1-X2-th OFDM symbols in a slot; for another example, when the sidelink communication is configured to be transmitted in a mini-slot, in this scenario, a slot in the following embodiments refers to the mini-slot defined or configured in the sidelink system, rather than the slot in the NR system; for still another example, when the sidelink communication is configured as symbol-level transmission, in this scenario, a slot in the embodiments may be replaced with OFDM symbols, or may be replaced with N OFDM symbols which are the time domain granularity of the symbol-level transmission.

In embodiments of the application, information configured by the base station, information indicated by signaling, information configured by a higher layer, and preconfigured information may be a set of configuration information or multiple sets of configuration information. When information contains multiple sets of configuration information, the UE selects a set of configuration information from the multiple sets of configuration information for use according to a predefined condition. When information is a set of configuration information, the set of configuration information may contain multiple subsets, and the UE selects a subset from the multiple subsets for use according to a predefined condition.

In embodiments of the application, some of the technical solutions provided are specifically described based on the V2X system, but their application scenarios should not be limited to the V2X system in sidelink communication, but may also be applied to other sidelink transmission systems. For example, the design based on V2X sub-channels in the following embodiments may also be used for D2D sub-channels or other sub-channels for sidelink transmission. The V2X resource pool in the following embodiments may also be replaced by the D2D resource pool in other sidelink transmission systems such as the D2D.

In embodiments of the application, "below a threshold value" may also be replaced by at least one of "above a threshold value," "below or equal to a threshold value," and "above or equal to a threshold value; similarly, "higher than a threshold value" may be replaced by at least one of "lower than a threshold value," "lower than or equal to a threshold value," and "higher than or equal to a threshold value." Among them, the related expressions may be replaced by other expressions with the same or similar meanings, for example, "higher than" may also be expressed as "exceeding."

In embodiments of the application, a UE used for transmitting a physical sidelink data channel is referred to as a transmitter UE and is denoted as a TX UE; and a UE used for receiving physical sidelink data channel is referred to as a receiver UE and is denoted as an RX UE.

In embodiments of the application, when a sidelink communication system is the V2X system, a terminal or UE may be various types of terminals or UEs such as Vehicle, Infrastructure, and Pedestrian, etc.

In order to make the purpose, technical schemes and advantages of the application more clear, the embodiments of the application will be further described in detail with reference to the accompanying drawings.

In sidelink communication systems of LTE and NR, bands used in sidelink communication are mainly concentrated in specific licensed bands, such as intelligent transport system (ITS) bands dedicated to vehicle traffic. With the development of 5G technology, the application scenarios of sidelink communication are increasing, so it is necessary to consider how to expand the traffic that can be supported by sidelink communication. An intuitive method is to apply the sidelink communication to more bands, such as unlicensed bands, so as to increase the services that may be accommodated by the sidelink systems by increasing the bandwidth. However, current sidelink communication systems have not discussed the possibility of sidelink communication in unlicensed bands, and have not introduced any enhancement mechanism for unlicensed bands.

In LTE sidelink communication systems and NR V2X systems in Release 16, a carrier used for sidelink communication is a carrier configured by a base station in RRC signaling, or a preconfigured carrier determined by a UE according to the information built in the equipment or provided by an application layer. The premise of this mechanism is that LTE sidelink communication and NR V2X communication use a licensed band, such as an ITS band dedicated to V2X systems, etc. Generally, it is assumed that there is basically no interference from other external communication systems (such as WiFi, Bluetooth, etc.) in this band. Therefore, by way of base station configuration, different carriers are scheduled for a UE supporting sidelink communication (referred to as a sidelink UE for short), which is beneficial for the sidelink communication system to better balance the loads on different carriers and avoid congestion. However, for a sidelink communication system running in an unlicensed band, it is necessary to consider the interference of other communication systems to sidelink communication on the unlicensed carrier. It is difficult for the base station to predict the wireless interference suffered by the UE due to different geographical locations and different receiving capabilities. Therefore, the mechanism that simply multiplexing carriers scheduled by the base station for the UE in LTE sidelink communication and NR V2X may cause the UE to be configured with carriers with severe wireless environment and high interference degree, thus affecting the quality of sidelink communication. Therefore, in order for the UE to acquire a carrier with better quality for sidelink communication, it is necessary to consider an enhanced carrier determination mechanism for the sidelink communication system. The typical application scenario of this mechanism is sidelink communication in the unlicensed band, but its application is not limited to this scenario, and it may also be used in other scenarios, e.g., communication in an ITS band or a frequency range 2 (FR2) band, because there may be a small amount of external interference or interference within third generation partnership project (3GPP) communication system in the above band, e.g., wireless interference from neighboring cells, etc. In addition, the carrier congestion degree determined by the UE itself is generally more accurate than the carrier congestion degree estimated by the base station according to the scheduling situation, so this mechanism is helpful to improve the performance of sidelink communication in other scenarios.

Figure 4:
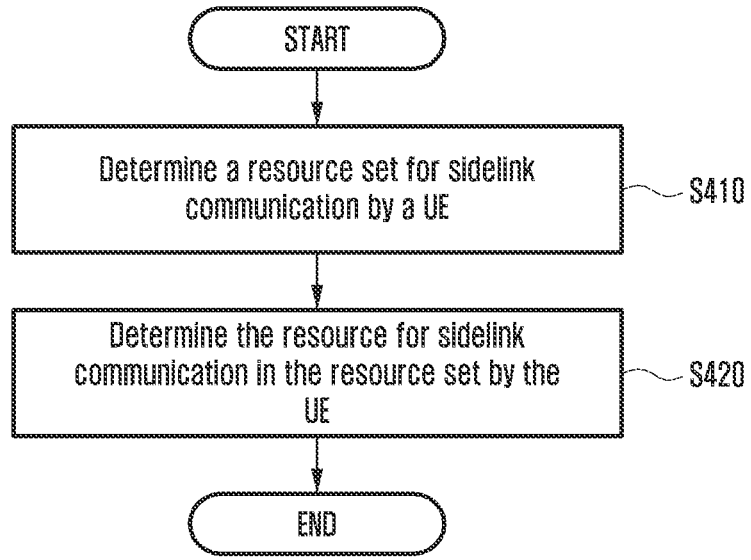
FIG. 4 illustrates a flowchart of a method for determining a resource for sidelink communication according to an embodiment of the disclosure.

FIG. 4 illustrates a flowchart of a method for determining a resource for sidelink communication according to an embodiment of the disclosure.

In this embodiment, as shown in FIG. 4, in operation S410, a UE determines a resource set for sidelink communication, where the resource set includes at least one resource. In operation S420, the UE determines a resource for sidelink communication in the resource set.

In this embodiment, the UE determines the resource for sidelink communication, including a time domain resource and/or frequency domain resource. The frequency domain resource includes a carrier for sidelink communication, and further includes a carrier on a licensed band and/or unlicensed band for sidelink communication.

In this embodiment, the UE determines that the resource for sidelink communication may be used for sidelink transmission and/or sidelink reception, where a resource for sidelink transmission and a resource for sidelink reception may be the same or different. When the resource for sidelink transmission and the resource for sidelink reception are different, the UE respectively determines the resource for sidelink transmission and the resource for sidelink reception. For example, the UE may determine to perform sidelink transmission on a certain carrier and perform sidelink reception on this carrier and one or more other carriers.

The determining of the resource for sidelink communication by the UE includes: determining, by the UE, the resource for sidelink communication by itself (for example, according to the resource set); and/or determining, by the UE, the resource for sidelink communication according to a configuration from a base station. In some implementations, the UE determines to make the determination by itself or according to the configuration from the base station (or other sidelink nodes) according to a pre-configuration or a configuration of a higher layer or the base station. For example, according to a preconfigured criteria, when the UE is in coverage (IC) of sidelink, it is determined by the base station; and when the UE is out of coverage (OoC) of sidelink, it is determined by the UE itself (or determined by other sidelink nodes if the UE is within a coverage of the other sidelink nodes). The advantage of this method is that the UE may determine the resource in a more appropriate manner in different scenarios. For example, when the configuration from the base station or other nodes can be acquired, the resource is determined based on the configuration from the base station or other nodes. This method may distribute the sidelink UE on each resource in a more balanced manner at the system level, make the sidelink UE use the resource with better performance, and also help to allocate multiple sidelink UEs that may have potential communication requirements to the same resource so that they can communicate with each other. When the configuration from the base station or other nodes cannot be acquired, the UE may still select the resource with better performance based on its own measurement and priority.

In this embodiment, the base station may also be replaced by other sidelink nodes. For example, when some sidelink UEs are configured as a group, the base station may be replaced by a group leader in the group of UEs. For another example, the base station may be replaced by an infrastructure UE in the sidelink UEs. Any mechanism applicable to the base station in this embodiment may also be similarly used in the scenario where the base station is replaced by other sidelink nodes, and the illustration will not be repeated.

The determining of the resource for sidelink communication according to the configuration from the base station by the UE includes: determining, by the UE, a resource set for sidelink communication, and reporting the set to the base station (in this disclosure, the reporting may also be replaced by transmitting), where the resource set includes at least one resource; and then determining the resource for sidelink communication according to the configuration from the base station. The method further includes: determining, by the UE, a resource set for sidelink communication, measuring link quality of each resource in the set, and reporting the set and/or the corresponding link quality to the base station; and then determining the resource for sidelink communication according to the configuration from the base station. The advantage of this method is that in the sidelink communication system, the interference suffered by the UE is usually difficult to be monitored and estimated by the base station. Therefore, if the base station can acquire the results of resource measurement by the UE itself, it may more accurately and appropriately schedule the UE into appropriate resources based on the interference situation reported by the UE.

The determining of the resource for sidelink communication by the UE itself includes: determining, by the UE, a resource set for sidelink communication, measuring link quality of each resource in the set, and determining the resource for sidelink communication according to the link quality and/or a priority of each resource. The method further includes: reporting, by a physical layer of the UE, the set and/or the corresponding link quality to a higher layer of the UE itself, and determining, by the higher layer, the resource for sidelink communication; or determining, by the physical layer of the UE, the resource for sidelink communication according to the link quality and/or the priority of each resource. The advantage of this method is that it may reduce the overhead introduced in the reporting process of the UE, and it may make the UE still try to select resources with better performance when it lacks the scheduling of the base station or other nodes.

The determining of the resource set for sidelink communication by the UE includes determining the set according to the configuration from the base station and/or a configuration from the higher layer and/or a pre-configuration. For example, the UE acquires a resource set from the base station or higher layer or pre-configuration, and determines the set or a subset of the set as the resource set for sidelink communication.

The resource set for sidelink communication determined by the UE includes a time domain resource set and/or a frequency domain resource set. The measuring of the link quality of each resource in the set by the UE includes measuring link quality of each time domain resource and/or measuring link quality of each frequency domain resource. For example, the resource set for sidelink communication determined by the UE includes multiple carriers, and the UE measures link quality on each carrier. For example, the resource set for sidelink communication determined by the UE includes multiple carriers and multiple slots, and the UE measures link quality on each carrier in each (or N) slot.

In some implementations, the frequency domain resource set determined by the UE includes at least one of: a set of carriers configured by the base station, further including a set of carriers on a licensed band and/or a set of carriers on an unlicensed band; or a preconfigured set of carriers.

In some implementations, the time domain resource set determined by the UE includes at least one of: periodic time domain resources, which are used to measure and determine resources used for sidelink transmission; a resource within a specific time range before (or after) a specific time reference point, where the specific time reference point includes at least one of: a time point when the UE is required to determine the resource for sidelink communication; a time point when the UE determines the resource for sidelink communication; a time point when the UE is expected to access or accesses a sidelink carrier. The resource may only include sidelink resources, or include sidelink resources and non-sidelink resources. For example, when a part of the periodic time domain resources determined by the UE are sidelink resources and a part do not belong to sidelink resources, the UE may only include the sidelink resources in the determined time domain resource set, or include both the sidelink resources and non-sidelink resources in the determined time domain resource set. The advantage of this method is that the UE may measure interference on specific resources instead of all resources, thus reducing the power consumption of UE measurement. By properly selecting the resources for measuring interference, the UE may obtain more accurate channel condition measurement results which are suitable for estimating the subsequent transmission.

The measuring of the link quality of each resource in the set by the UE includes measuring at least one of: (SL-) Received Signal Strength Indication (RSSI); (SL-) Reference Signal Receiving Power (RSRP); (SL-) Reference Signal Receiving Quality (RSRQ); (SL-) Channel State Information (CSI); a Channel Occupation Ratio (CR); a Channel Busy Ratio (CBR); or measurement parameters based on other reference signals (e.g., PRS and SRS). Optionally, only SL-RSSI is measured when measuring on an unlicensed band, and at least one of the above is measured when measuring on a licensed band.

In some implementations, the acquiring of the resource set from the base station by the UE includes acquiring the resource set from RRC signaling (such as MIB/SIB/RMSI signaling) broadcasted/multicasted/groupcasted by the base station, and/or acquiring the resource set from UE-specific RRC signaling. In some implementations, the resource set is dedicated to UE that has the capability and/or is configured and/or enabled for sidelink communication in an FR2 and/or unlicensed band; accordingly, the UE determines whether it is required to acquire the resource set according to whether its own capability supports, and/or is configured and/or enabled for sidelink communication in the FR2 and/or unlicensed band.

The reporting of the set and/or the corresponding link quality to the base station by the UE includes: reporting all of resources in the set and/or corresponding link quality to the base station, or reporting a subset of all of the resources in the set and/or corresponding link quality to the base station, where the subset may be several resources with the optimal corresponding link quality and/or the highest priority. For example, according to a threshold range configured by the base station/higher layer or preconfigured, when link quality corresponding to any resource in the set satisfies the threshold range, the UE reports the resource and/or the link quality corresponding to the resource to the base station; otherwise, the link quality corresponding to the resource is not reported. For example, according to the reported number N configured by the base station/higher layer or preconfigured, the UE selects corresponding N resources with the highest priority in the set, and reports the N resources and/or link quality corresponding to the N resources. For example, according to the threshold range and the reported number N configured by the base station/higher layer or preconfigured, the UE selects N resources in all of resources in the set whose corresponding link quality satisfies the threshold range, and reports the N resources and/or the link quality corresponding to the N resources; wherein, the selection may be random selection or selection by priority. The advantage of this method is that the UE may only report several resources that satisfy the standards or that the UE is expected to select, instead of a complete resource set, thus saving the overhead of reporting resources and their link quality.

In some implementations, the UE reports the subset of all of the resources in the set and/or the corresponding link quality to the base station, where the subset is determined according to a resource type. For example, the resource set determined by the UE includes a time domain resource and/or a frequency domain resource, wherein the UE measures on the time domain resource and/or frequency domain resource, but only reports the frequency domain resource to the base station.

The UE may determine the priority of the resource according to at least one of: a frequency domain position of the resource, for example, a priority of a resource corresponding to a licensed band being higher than a priority of a resource corresponding to an unlicensed band; a preconfigured resource priority, or a preconfigured criteria for determining a resource priority; link quality corresponding to the resource, for example, a resource with higher link quality having a higher priority. In some implementations, the UE determines a priority of resources as follows: a resource in a licensed band and with link quality greater than threshold x1>a resource in an unlicensed band and with link quality greater than threshold y1>a resource in the licensed band and with link quality less than or equal to threshold x2>a resource in the unlicensed band and with link quality less than or equal to threshold y2. If there are multiple resources in any of the above items, they may be further arranged according to link quality. For example, when there are two resources Resource #1 and Resource #2 in the licensed band and with link quality greater than the threshold x1, if link quality of Resource #1 is higher than that of Resource #2, then a priority of Resource #1 is higher than that of Resource #2, and vice versa.

Optionally, the UE reports the set and/or the corresponding link quality to the base station when a specific condition is satisfied. The specific condition may be configured by the base station and/or configured by the higher layer and/or preconfigured. The specific condition includes triggering the UE to report by the base station, and/or triggering the UE to report by itself. Further, the specific condition includes at least one of that: a specific trigger signaling from the base station is received; the UE has not been configured/scheduled by the base station (or the higher layer/other UEs) with resources that may be used for sidelink communication; the UE has been configured/scheduled by the base station (or the higher layer/other UEs) with resources that may be used for sidelink communication, but more resources that may be used for sidelink communication are needed (for example, the base station has scheduled a carrier for sidelink transmission for the UE, but the UE wants to acquire a second carrier for sidelink transmission); the UE has been configured/scheduled by the base station (or the higher layer/other UEs) with resources that may be used for sidelink communication, but the resources are needed to be replaced (for example, if link quality of the resources does not satisfy a specific threshold range (which may be configured by the base station/higher layer or preconfigured), the UE is required to replace the resources); the UE has been configured/scheduled by the base station (or the higher layer/other UEs) with resources that may be used for sidelink communication, but the UE switches to other cells or other base stations. The advantage of this method is that by reasonably setting the specific condition for triggering UE to report, the UE may only report when there is a requirement to select/switch carriers in the actual system, so that the UE may obtain appropriate carrier scheduling when there is a requirement, and does not report when there is no requirement actually to avoid meaningless overhead.

Optionally, the UE reports the set and/or the corresponding link quality to the base station, and further reports at least one of: a used sidelink resource that is expected to be replaced; and a used sidelink resource that is expected to be remained. For the former, the typical application scenario is that the link quality of the sidelink resource currently used by the UE does not satisfy the specific threshold range. For the latter, the typical application scenario is cell handover happened, but the link quality of the currently used sidelink resource satisfies the specific threshold range, and UE does not want to switch carriers in order to maintain service continuity.

The reporting of the set and/or the corresponding link quality to the base station by the UE includes reporting using at least one of the following signaling or channels: RRC signaling; Media Access Control (MAC) signaling, including newly introduced MAC CE which is dedicated to reporting the set and/or the corresponding link quality; Physical Uplink Control Channel (PUCCH), including an existing PUCCH format or a newly introduced PUCCH format which is dedicated to reporting the set and/or the corresponding link quality.

In this embodiment, the determining of the resource for sidelink communication by the UE includes determining one or more resources. When the UE determines that multiple carriers are used for sidelink communication, carrier aggregation between the multiple carriers is used. In some implementations, the UE determines that at least one carrier on a licensed band and at least one carrier on an unlicensed band are used for sidelink communication, and takes the carrier on the licensed band as an anchor carrier (or primary carrier) and the carrier on the unlicensed band as a non-anchor carrier (or secondary carrier). The advantage of this method is that, since the number of resources in the licensed band is relatively limited, while more resources may be allocated for sidelink communication in the unlicensed band, the UE may transmit control/data signaling with limited size on the anchor carrier, indicate resources on the non-anchor carrier in the control/data signaling, and transmit control/data signaling with larger size in the resources on the non-anchor carrier, thus reducing the channel congestion degree on the anchor carrier in the sidelink system, and guarantying the high throughput of sidelink communication by using a non-anchor carrier with larger bandwidth to transmit large-size data.

When the sidelink communication system of LTE and NR runs in the licensed band, since there is no need to consider the influence of wireless interference from non-LTE/NR systems on the communication quality, only the sensing mechanism corresponding to mutual interference between different UEs in the sidelink system is introduced in the LTE/NR sidelink communication, and the mechanism like LBT (Listen Before Talk) corresponding to interference caused by other external communication systems such as WiFi in NR-unlicensed (NR-U) system is not used. If the application range of the sidelink communication is extended to the unlicensed band, it is necessary to design an interference cancellation mechanism corresponding to the unlicensed band for sidelink communication. The typical application scenario of this mechanism is sidelink communication in the unlicensed band, but its application is not limited to this scenario, and it may also be used in other scenarios, e.g., communication in an ITS band or an FR2 band, because there may be a small amount of external interference or interference within 3GPP communication system in the above band, e.g., wireless interference from neighboring cells, etc.

Figure 5:
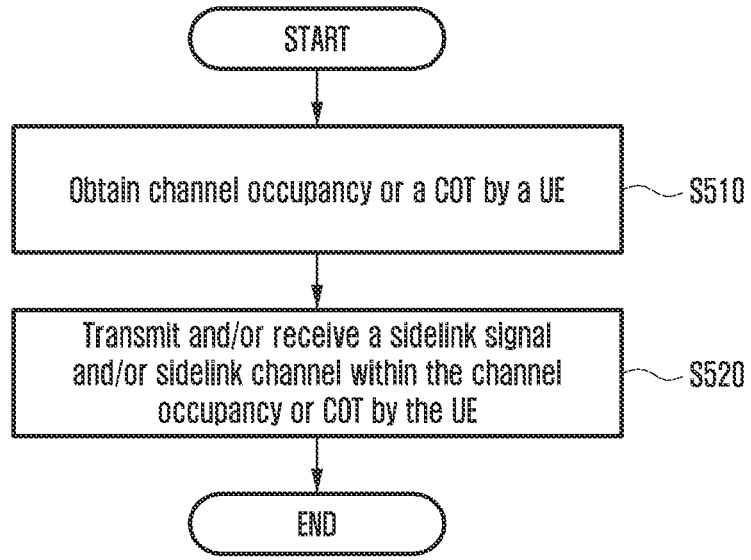
FIG. 5 illustrates a flowchart of a method for sidelink communication on a shared spectrum according to an embodiment of the disclosure.

FIG. 5 illustrates a flowchart of a method for sidelink communication on a shared spectrum according to an embodiment of the disclosure.

Referring to FIG. 5, in operation S510, a UE obtains Channel Occupancy or a Channel Occupancy Time (COT). The channel occupancy or COT may be initialized by the UE, or initialized by a base station and shared to the UE, or initialized by other UEs and shared to the UE. A COT shared to another UE by the UE may be indicated in SCI and/or higher layer signaling such as MAC CE.

In operation S520, the UE transmits and/or receives a sidelink signal/channel on the channel occupancy or COT.

Figure 6:
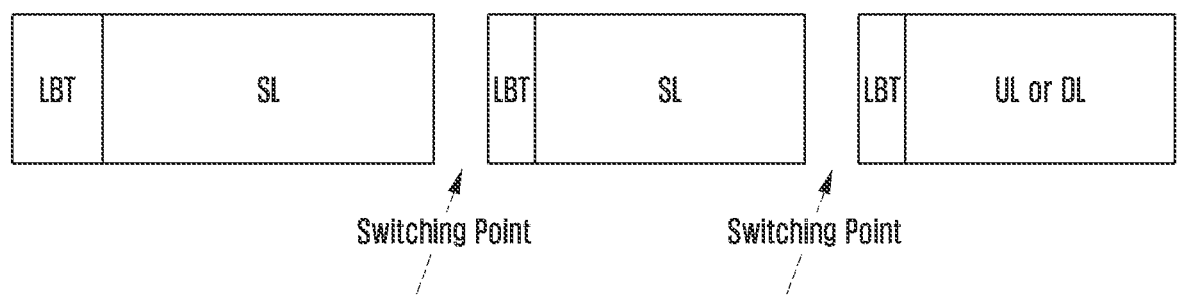
FIG. 6 illustrates a diagram of a channel occupancy time (COT) structure in sidelink communication according to an embodiment of the disclosure.

FIG. 6 illustrates an example of a COT structure in sidelink communication according to an embodiment of the disclosure.

Referring to FIG. 6, a COT structure may include one or more switching points, as indicated by dashed arrows. The COT structure shown in FIG. 6 is only an example, and embodiments of the disclosure are not limited thereto. In some implementations, according to COT structure related information indicated by a base station and/or (pre-)defined/(pre-)configured, a UE determines one or more switching points within a COT, which correspond to at least one of uplink/downlink switching, uplink/sidelink switching, downlink/sidelink switching and sidelink/sidelink switching. The sidelink/sidelink switching includes switching between different types of channels (for example, switching between PSSCH/PSCCH and PSFCH), and/or switching between sidelink signals/channels transmitted by different UEs. When the UE determines a resource for sidelink transmission by itself, a determined time domain resource should not cross any switching point, or should not cross the uplink/sidelink switching point or the downlink/sidelink switching point. The switching point may be indicated/determined by gap. For example, the UE determines that there is a gap with a length of x at a specific time domain position according to an indication of the base station, and the gap with a length of x is considered by the UE to correspond to at least one of the above switching points.

In some implementations, before performing the sidelink transmission, the UE is required to determine whether to perform LBT and/or what type of LBT to perform, including at least one of that:
- if the UE starts transmission at a starting position of a COT, the LBT does not need to be performed before the sidelink transmission, and/or a specific type (e.g., Type 2A/2B/3C) of LBT needs to be performed; optionally, when the UE starts transmission at a starting position of the COT initialized by itself, the LBT does not need to be performed before the sidelink transmission;
- if the UE starts sidelink transmission after a switching point, a specific type of LBT needs to be performed before the sidelink transmission;
- the UE is required to perform a specific type of LBT before starting any sidelink transmission.

If the LBT is successful, the UE may perform the above sidelink transmission; otherwise, if the LBT fails, the UE is required to abandon the sidelink transmission and/or abandon transmission and/or reception in the above COT.

Figure 7:
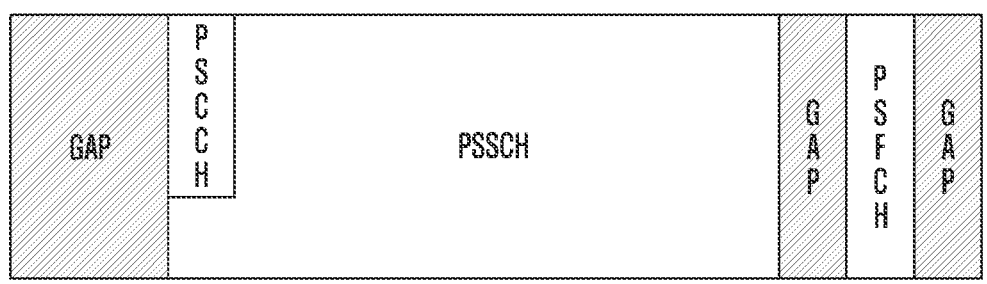
FIG. 7 illustrates a diagram of a sidelink slot structure according to an embodiment of the disclosure.

An example of a sidelink slot structure is shown in FIG. 7. FIG. 7 is a specific slot structure (for example, referred to as a first slot structure) may include one or more slots according to an embodiment of the disclosure. The specific slot structure shown in FIG. 7 is only an example, and embodiments of the disclosure are not limited thereto. In some implementations, when the UE transmits and/or receives a sidelink signal/channel within a COT, a specific slot structure is used, which may be adjusted based on a slot structure in the existing technique (for example, referred to as a second slot structure), and the adjusting includes at least one of:
- adding a gap at or before a starting position of a slot; optionally, a length of the gap corresponds to at least one type of LBT, for example, similar to Type 1 channel access on the shared spectrum in the existing technique, and the length of the gap corresponding to category 4 (Cat-4) LBT is used;
- adding a gap at or before a starting position of PSSCH;
- adding a gap at or after an ending position of PSSCH;
- adding a gap at or before a starting position of PSFCH; optionally, a length of the gap corresponds to at least one type of LBT, for example, similar to 2A/2B/2C channel access on the shared spectrum in the existing technique, and the length of the gap corresponding to one-shot LBT is used;
- adding a gap at or after an ending position of PSFCH.

Optionally, the above gaps are calculated independently in addition to a gap existing in the slot structure of the existing technique; or, when the position where the gap is added corresponds to the gap existing in the slot structure of the existing technique, if the length of the newly added gap is longer than the gap existing in the slot structure of the existing technique, the newly added gap is used to replace the gap existing in the slot structure of the existing technique, otherwise, the gap existing in the slot structure of the existing technique is used.

For example, in the existing technique, when a gap of 1 symbol exists between the PSSCH and the PSFCH, at least one of the following methods is used when adding a gap after the ending position of the PSSCH and/or adding a gap at the starting position of the PSFCH:
- a gap with a length of 1 symbol +x existing between the ending position of the PSSCH and the starting position of the PSFCH;
- when x is greater than or equal to a length of 1 symbol, a gap with a length of x existing between the ending position of the PSSCH and the starting position of the PSFCH;
- when x is less than the length of 1 symbol, a gap with the length of 1 symbol existing between the ending position of the PSSCH and the starting position of the PSFCH.

The length of the newly added gap is denoted as x in unit of symbols or physical time lengths, e.g., microseconds/nanoseconds.

Optionally, it also includes at least one of the following adjustments on the slot structure in the existing technique to keep a total length of a slot unchanged:
- The length of the first symbol (or the first N symbols, or all symbols) of the slot is correspondingly shortened after adding a gap at or before the starting position of the slot (the method is mainly because the first symbol in the sidelink communication system is usually used for AGC, so it may be considered to use the first several milliseconds of the symbol as a gap, and continue to use the remaining several milliseconds for AGC);
- the length of the last symbol (or the last N symbols, or all symbols) of the PSSCH is correspondingly shortened after adding a gap at or before the starting position of the PSSCH;
- the length of the last symbol (or the last N symbols, or all symbols) of the PSSCH is correspondingly shortened after adding a gap at or after the ending position of the PSSCH;
- the length of PSFCH symbols (which may be at least one of the first symbol, the last symbol and all symbols) in the existing slot structure is correspondingly shortened after adding a gap at or before the starting position of the PSFCH;
- the length of PSFCH symbols (which may be at least one of the first symbol, the last symbol and all symbols) in the existing slot structure is correspondingly shortened after adding a gap at or after the ending position of the PSFCH.

The above method for shortening a certain channel includes at least one of: puncturing the channel; adjusting a length of the channel and performing rate matching based on the adjusted length. For example, after adding a gap with a length of x at the ending position of the PSFCH, a part with a length of x at the end of the last symbol of the PSFCH in the existing slot structure is punctured.

The slot structure may also include a slot structure based on slot aggregation, and specifically, the slot structure includes N consecutive slots. Optionally, in the N consecutive slots, only the first slot includes the PSCCH, and/or only the last slot includes the PSFCH. The above various methods for adjusting the slot structure are also applicable to the slot structure based on slot aggregation.

Optionally, the N consecutive slots are physically continuous. This is because, considering that the sidelink slots may be configured to be discrete in time domain, there may still be an absolute time gap between logically consecutive slots, which may affect the judgment of other communication systems, such as WiFi, and make them think that they may occupy the channel used by sidelink communication systems.

Optionally, the UE supports both this slot structure and the slot structure in the existing technique in the unlicensed band, or the UE only supports this slot structure in the unlicensed band. Optionally, the type of slot structure supported by the UE is determined based on at least one of UE capability, pre-configuration, higher layer or base station configuration.

In this embodiment, if the UE uses Mode 2 of determining transmission resources by itself and determining the resources based on sensing, the UE may determine a sensing mode according to the monitored interference.

In some implementations, the UE only performs the sensing on a COT initialized by itself, and/or initialized by the base station and shared to the UE for sidelink communication, and/or initialized by other UEs and used for sidelink communication; the UE does not perform the sensing on resources (e.g., resources other than the COT initialized by the UE itself, and/or initialized by the base station and shared to the UE for sidelink communication, and/or initialized by other UEs and shared to the UE and/or used for sidelink communication) that do not satisfy the above COT limitation. In some implementations, if the UE monitors interference in the LBT process before a COT, the UE skips the sensing on the COT.

Figure 8:
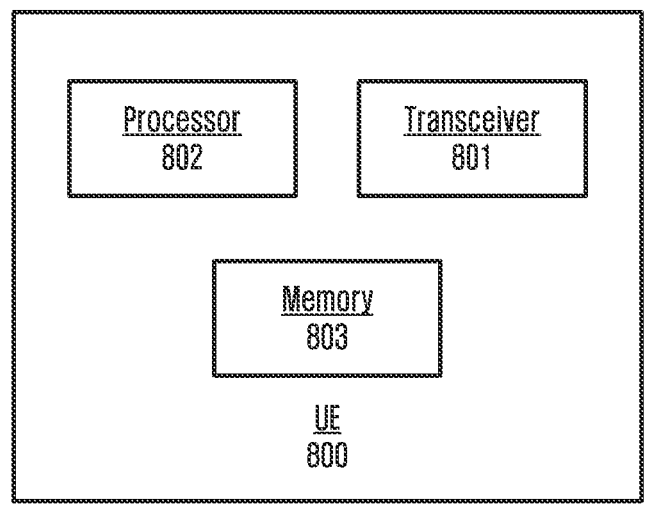
FIG. 8 illustrates a block diagram of a configuration of a UE according to an embodiment of the disclosure.

FIG. 8 illustrates a block diagram of a configuration of a UE according to an embodiment of the disclosure.

Referring to FIG. 8, a UE 800 according to various embodiments of the disclosure may include a transceiver 801, a processor 802 and a memory 803. For example, the transceiver 801 may be configured to transmit and receive signals. For example, the processor 802 may be coupled to the transceiver 801. For example, the memory 803 may store instructions executable by the processor 802 that, when executed by the processor 802, cause the processor 802 to perform the aforementioned method.

While the UE is illustrated as having separate functional blocks for convenience of explanation, the configuration of the UE 800 is not limited thereto. For example, the UE 800 may include a communication unit consisting of a transceiver and a processor. The UE 800 may communicate with at least one network node by means of the communication unit.

Figure 9:
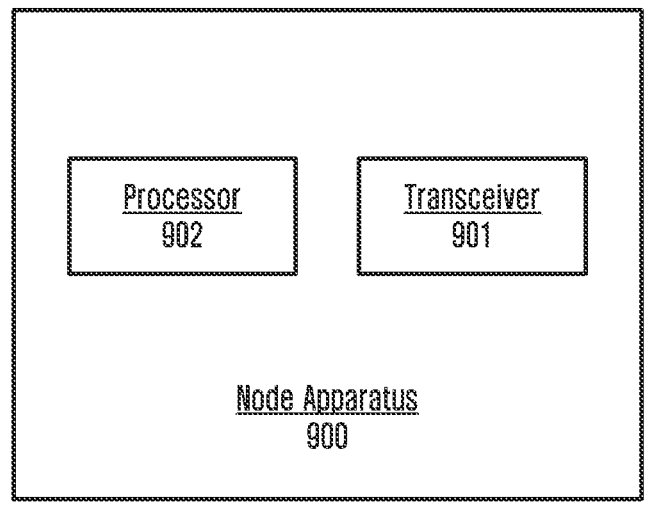
FIG. 9 illustrates a block diagram of a configuration of a node apparatus according to an embodiment of the disclosure.

FIG. 9 illustrates a block diagram of a configuration of a node apparatus according to an embodiment of the disclosure. The node apparatus includes one of: a base station; and other sidelink UEs.

Referring to FIG. 9, a node apparatus 900 according to various embodiments of the disclosure may include a transceiver 901 and a processor 902. For example, the transceiver 901 may be configured to transmit and receive signals. For example, the processor 902 may be coupled to the transceiver 901 and configured to: receive a resource set and/or corresponding link quality from a UE; and configure a resource for sidelink communication for the UE according to the resource set and/or the corresponding link quality. For example, the processor 902 may further be configured to receive, from the UE, at least one of: a used sidelink resource that is expected to be replaced; and a used sidelink resource that is expected to be remained.

According to various embodiments of the disclosure, at least part of the UE (e.g., modules or functions thereof) or the method (e.g., operations) may be implemented by an instruction which is stored in a computer-readable storage medium (e.g., the memory) in a form of a program module. When executed by a processor or controller, the instruction may enable the processor or controller to perform corresponding functions. The computer-readable medium may include, for example, a hard disk, a floppy disk, a magnetic media, an optical recording media, a digital versatile disc (DVD), a magneto-optical media, and the like. The instructions may include a code made by a compiler or a code which can be executed by an interpreter. The module or UE according to various embodiments of the disclosure may include at least one or more of the aforementioned elements, some of the aforementioned elements may be omitted, or may further include other additional elements. Operations executed by the module, program module, or other elements according to various embodiments of the disclosure may be executed sequentially, in parallel, repeatedly, or in a heuristic way. Alternatively, at least some operations may be executed in a different order or may be omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first terminal in a sidelink (SL) communication, the method comprising:
   determining a resource set for the SL communication;
   obtaining information on a channel occupancy for performing an SL transmission;
   transmitting, to a second terminal, SL control information (SCI) including the information on the channel occupancy;
   identifying a slot structure for transmitting or receiving an SL signal; and
   determining to shorten a length of a physical sidelink shared channel (PSSCH) for the slot structure, after adding a gap before a starting position of the PSSCH, the gap being identified configuration information associated with the gap for the SL transmission,
   wherein at least one resource for the SL communication is determined according to the resource set.

2. The method of claim 1, further comprising:
   determining whether to perform a listen before talk (LBT) before transmitting or receiving an SL signal.

3. The method of claim 2, further comprising:
performing a specific type of LBT before starting any transmission or reception of the SL signal.

4. The method of claim 1, further comprising:
receiving, from a base station via higher layer signaling, control message including the configuration information associated with the gap for the SL transmission; and identifying the gap before the starting position of the PSSCH based on the configuration information.

5. The method of claim 1, wherein at least one symbol of an end of the PSSCH is shortened.

6. A first terminal in a sidelink (SL) communication, the first terminal comprising:
a transceiver configured to transmit and receive signals; and
a processor coupled to the transceiver,
wherein the processor is configured to:
determine a resource set for the SL communication,
obtain information on a channel occupancy for performing an SL transmission,
transmit, to a second terminal via the transceiver, SL control information (SCI) including the information on the channel occupancy,
identify a slot structure for transmitting or receiving an SL signal, and
determine to shorten a length of a physical sidelink shared channel (PSSCH) for the slot structure, after adding a gap before a starting position of the PSSCH, the gap being identified configuration information associated with the gap for the SL transmission, and
wherein at least one resource for the SL communication is determined according to the resource set.

7. The first terminal of claim 6, wherein the processor is further configured to:
determine whether to perform a listen before talk (LBT) before transmitting or receiving an SL signal.

8. The first terminal of claim 7, wherein the processor is further configured to:
perform a specific type of LBT before starting any transmission or reception of the SL signal.

9. The first terminal of claim 6, wherein the processor is further configured to:
receive, from a base station via higher layer signaling, control message including the configuration information associated with the gap for the SL transmission, and
identify the gap before the starting position of the PSSCH based on the configuration information.

10. The first terminal of claim 6, wherein at least one symbol of an end of the PSSCH is shortened.

* * * * *